(12) United States Patent
Henderson et al.

(10) Patent No.: US 6,814,397 B2
(45) Date of Patent: Nov. 9, 2004

(54) HYBRID PICKUP BOX

(75) Inventors: Jack V. Henderson, West Bloomfield, MI (US); Keijo J. Huotari, Fenton, MI (US); Greg Brower, Fenton, MI (US); Stephen R. Roddy, Grosse Point Part, MI (US); Bradford Armstrong, Barrie (CA)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/408,405

(22) Filed: Apr. 7, 2003

(65) Prior Publication Data

US 2003/0218360 A1 Nov. 27, 2003

Related U.S. Application Data

(60) Provisional application No. 60/370,804, filed on Apr. 5, 2002, and provisional application No. 60/377,729, filed on May 3, 2002.

(51) Int. Cl.$^7$ .............................................. B62D 25/20
(52) U.S. Cl. ............................... 296/184.1; 296/181.3; 296/186.1; 296/193.04; 296/29; 296/39.2
(58) Field of Search ............................... 296/10, 181.2, 296/181.3, 183.1, 184.1, 186.1, 193.04, 193.05, 193.08, 29, 39.1, 39.2

(56) References Cited

U.S. PATENT DOCUMENTS

| | | | | |
|---|---|---|---|---|
| 3,462,187 | A | * | 8/1969 | Hassler .................... 296/183.2 |
| 4,705,716 | A | | 11/1987 | Tang |
| 5,188,418 | A | | 2/1993 | Walworth, Jr. et al. |
| 5,228,742 | A | | 7/1993 | Johnson et al. |
| 5,419,602 | A | * | 5/1995 | VanHoose .................. 296/39.1 |
| 5,544,932 | A | | 8/1996 | Walworth, Jr. et al. |
| 5,575,525 | A | | 11/1996 | Walworth, Jr. et al. |
| 5,660,427 | A | | 8/1997 | Freeman et al. |
| 5,730,486 | A | | 3/1998 | Jurica |
| 5,819,390 | A | | 10/1998 | Clare |
| 5,938,272 | A | | 8/1999 | Jurica et al. |
| 6,012,754 | A | | 1/2000 | Clare et al. |
| 6,036,258 | A | | 3/2000 | Clare et al. |
| 6,105,231 | A | | 8/2000 | Clare et al. |
| 6,128,815 | A | | 10/2000 | Jurica et al. |
| 6,142,549 | A | | 11/2000 | Clare et al. |
| 6,170,905 | B1 | * | 1/2001 | Jurica ....................... 296/184.1 |
| 6,237,211 | B1 | | 5/2001 | Clare et al. |
| 6,280,551 | B1 | | 8/2001 | Hilligoss |
| 6,347,454 | B1 | | 2/2002 | Jurica et al. |
| 6,382,671 | B1 | * | 5/2002 | MacLellan .................. 280/789 |
| 6,422,642 | B1 | | 7/2002 | Grimm et al. |
| 6,439,649 | B1 | | 8/2002 | Lorenzo et al. |
| 6,454,345 | B1 | * | 9/2002 | Campus ................. 296/203.01 |
| 6,464,276 | B1 | | 10/2002 | Gruich |
| 6,592,170 | B2 | * | 7/2003 | McWilliams ............. 296/186.1 |
| 2001/0038218 | A1 | | 11/2001 | Clare et al. |
| 2001/0038219 | A1 | | 11/2001 | Clare et al. |
| 2001/0038230 | A1 | | 11/2001 | Clare et al. |
| 2001/0050491 | A1 | | 12/2001 | Clare et al. |
| 2002/0117873 | A1 | * | 8/2002 | Lorenzo et al. ............ 296/39.2 |

* cited by examiner

*Primary Examiner*—Patricia L. Engle
(74) *Attorney, Agent, or Firm*—Clark Hill PLC

(57) ABSTRACT

A bed assembly for a motor vehicle includes a floor pan that defines a bed surface extending between longitudinal sides. Each of the longitudinal sides includes a side support surface spaced from and parallel to the bed surface. The bed assembly also includes a sidewall panel having a lower end defining a base surface disposed adjacent to and supported by the side support surface. In addition, the bed assembly includes a retention member extending along a portion of one of the longitudinal sides to secure the base surface to the side support surface. The retention member maintains the sidewall panel in abutting relation to the floor pan.

35 Claims, 5 Drawing Sheets

HYBRID PICKUP BOX

CROSS REFERENCE TO RELATED APPLICATIONS

This application claims the benefit of U.S. Provisional Application Ser. No. 60/370,804 filed Apr. 5, 2002, and U.S. Provisional Application Ser. No. 60/377,729 filed May 30, 2002.

FIELD OF THE INVENTION

This invention relates to a bed assembly for a motor vehicle. More particularly, the invention relates to a reduced weight bed assembly for a motor vehicle having a secure connection between a floor pan and a sidewall panel.

DESCRIPTION OF RELATED ART

A majority of motor vehicle component parts are formed from steel. The use of steel for the component parts is advantageous in many regards: it is relatively inexpensive, recyclable, and can be shaped into finished parts easily. Steel is, however, also a heavy material. Thus, the use of steel in forming many of the component parts of the motor vehicle results in an increase in the overall weight of the motor vehicle.

Reduction of overall motor vehicle weight is a constant goal for motor vehicle manufacturers. A reduction in motor vehicle weight increases fuel efficiency and can result in lower manufacturing costs. Previous reductions in motor vehicle weight have been achieved by reducing the number of component parts and by using different materials to form the component parts. With regard to the use of different materials, many component parts are now being made from aluminum, synthetic materials, such as plastic, and other materials that are lighter than steel.

Pickup trucks, and certain hybrid vehicles, include a bed at a rear portion to provide a storage space for large items. The bed commonly occupies a significant area of the pickup truck. Thus, manufacturing a reduced weight bed would contribute significantly to reducing the overall weight of the pickup truck. The use of plastic materials to form a reduced weight bed is known to those skilled in the art. For example, U.S. Pat. No. 6,439,649 to Lorenzo et al. discloses a bed that is formed from a plurality of sections each separately molded from a plastic material. The plurality of sections includes a central section defining most of a floor and a front wall, a left side section defining a left sidewall and a portion of the floor, and a right side section defining a right sidewall and the remaining portion of the floor. In one of the multiple embodiments of the invention, the left sidewall is secured to the floor portion of the left section by a tongue in groove joint. The floor portion of the left side section includes a groove defined by spaced apart upright walls. The left sidewall includes a protruding tongue, which is received within the groove to secure the left sidewall to the floor portion of the left section.

In addition, U.S. Pat. No. 6,422,642 to Grimm et al. discloses a vehicle pick-up bed that is made from polymeric material and that can be folded into shape by hand. The vehicle pick-up bed is formed from a sheet of material adhered to a generally flat sheet of reinforced polymeric material. The sheet of material is placed in a mold. The reinforced polymeric material is injected into the mold over a back side of the sheet of material. The reinforced polymeric material and the sheet of material are then molded into a solid, forming a generally flat component. When the molding process is complete, the generally flat component is folded along a plurality of hinge edges into the shape of the vehicle pick-up bed. The vehicle pick-up bed, after folding, includes a center section or floor, a first side wall, a second side wall, and a third side wall.

Besides the use of plastic materials, the overall weight of the motor vehicle can also be reduced by utilizing different manufacturing methods. A typical floor pan is formed by a stamping operation, which requires sheet material of a certain thickness. The thickness of the sheet material provided is greater than that desired in the finished floor pan to compensate for reductions in thickness that occur during stamping. But because the amount of thickness reduction varies in each stamping operation, the resulting floor pan can still be quite thick, thus increasing the weight of the motor vehicle.

U.S. Pat. No. 6,347,454 to Jurica et al. discloses a roll forming process to be used in the stead of the stamping operation to manufacture a floor pan of a vehicle bed. In the roll forming process, a thin sheet of metal is utilized to form the floor pan. As a result, the weight of the bed is reduced, contributing to a reduction in the overall weight of the motor vehicle.

SUMMARY OF THE INVENTION

A bed assembly for a motor vehicle includes a floor pan that defines a bed surface extending between longitudinal sides. Each of the longitudinal sides includes a side support surface spaced from and parallel to the bed surface. The bed assembly also includes a sidewall panel having a lower end defining a base surface disposed adjacent to and supported by the side support surface. In addition, the bed assembly includes a retention member extending along a portion of one of the longitudinal sides to secure the base surface to the side support surface. The retention member maintains the sidewall panel in abutting relation to the floor pan.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
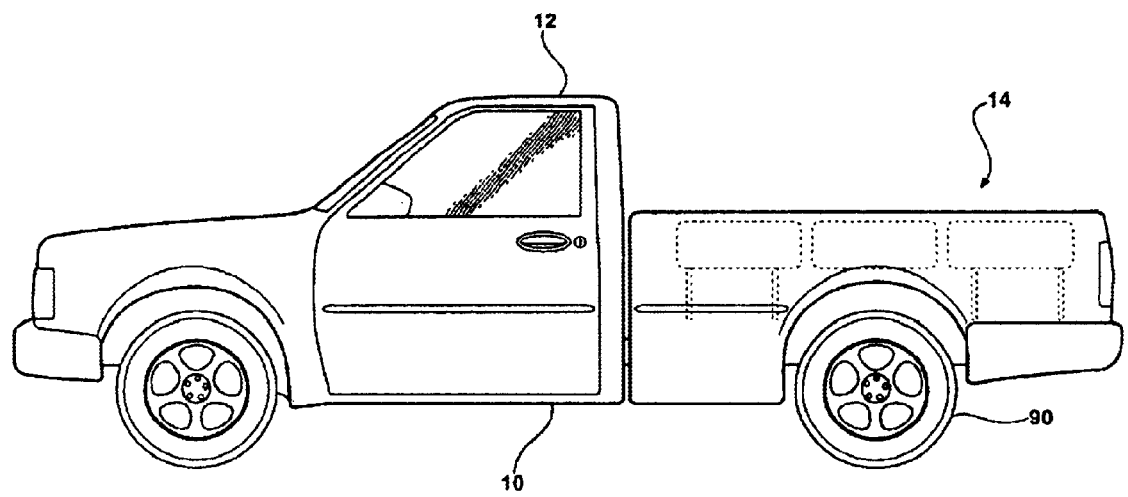
FIG. 1 is a side view of a motor vehicle including a bed assembly according to a first embodiment of the invention.

Referring to FIG. 1, a motor vehicle 10, such as a pick-up truck 10, includes a passenger cab 12 and a bed assembly, generally indicated at 14, extending rearwardly therefrom. The bed assembly 14 allows for storage and transport of larger items and loads therewithin.

Figure 2:
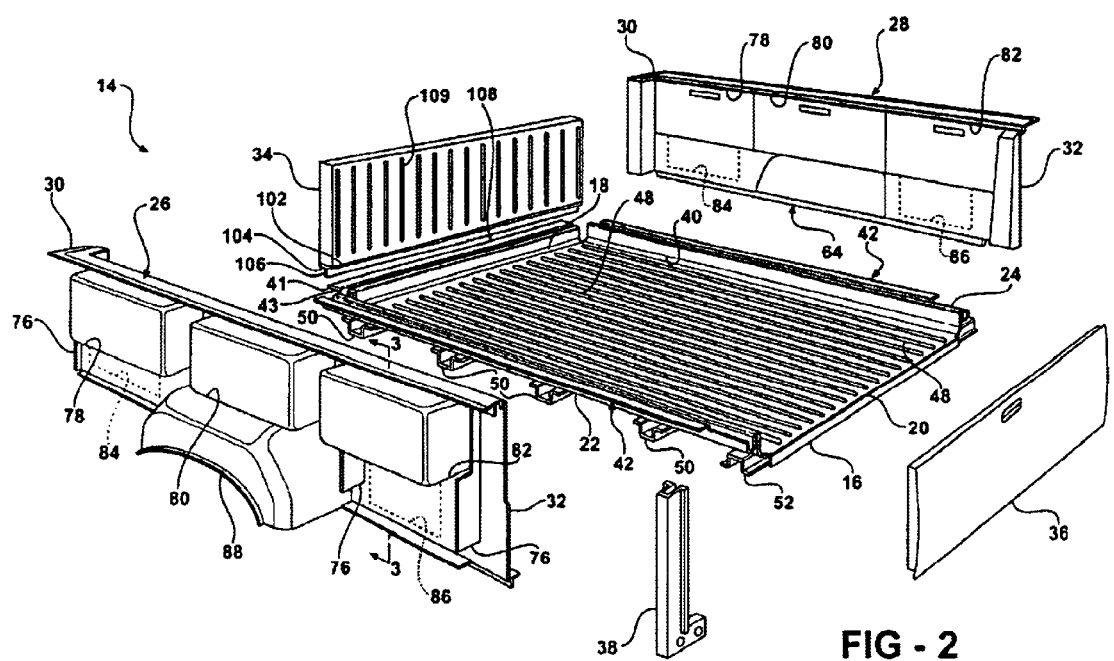
FIG. 2 is an exploded, rear, perspective view of the bed assembly.

Referring to FIG. 2, the bed assembly 14 includes a generally planar floor pan 16 having a front edge 18, a rear edge 20, and longitudinal sides 22, 24 extending therebetween. The bed assembly 14 also includes sidewall panels, generally indicated at 26, 28, each extending between a forward end 30 and a rearward end 32. A headboard 34 is secured to the passenger cab 12 and extends perpendicularly out from the floor pan 16 at the front edge 18 thereof. The headboard 34 is also fixedly secured to the sidewall panels 26, 28 at the forward ends 30 thereof by welding, bonding, or by mechanical fasteners, all of which are known to those skilled in the art.

A tailgate 36 disposed adjacent to the rearward end 32 of each of the sidewall panels 26, 28. The tailgate 36 is movable between an open position, in which the tailgate 36 is generally parallel to the floor pan 16, and a closed position, in which the tailgate 36 is generally parallel to the headboard 34 and latches with the rearward end 32 of each of the sidewall panels 26, 28. When the tailgate 36 is in the open position, the floor pan 16 may be accessed from outside the pickup truck 10 for loading and unloading of items onto and off of the floor pan 16. Corner supports 38 (one shown) are provided at the rearward end 32 of the sidewall panels 26, 28 to support the sidewall panels 26, 28.

The floor pan 16 includes a corrugated bed surface 40 extending between the longitudinal sides 22, 24. A side support surface, generally indicated at 42, extends outwardly along a portion of each of the longitudinal sides 22, 24 of the floor pan 16 and supports the sidewall panels 26, 28 thereon.

Figure 3:
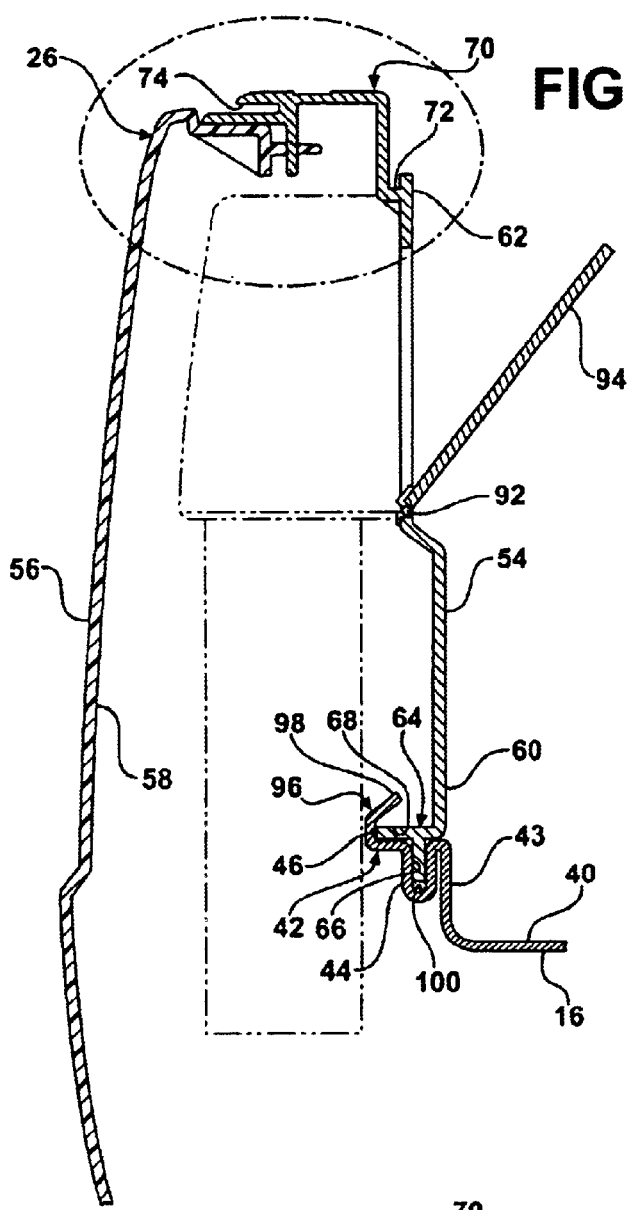
FIG. 3 is a cross-sectional view taken along line 3—3 of FIG. 2 of a sidewall panel of the bed assembly with a storage compartment shown in phantom.
Figure 4:
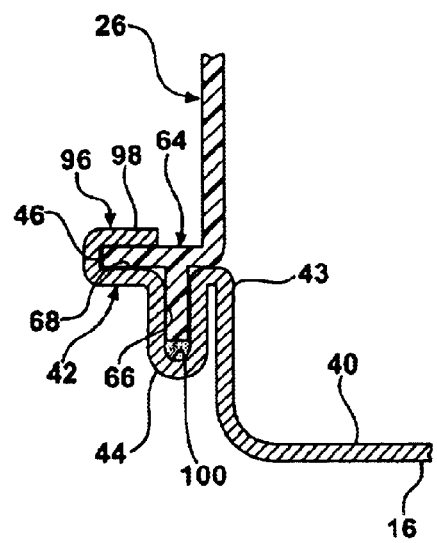
FIG. 4 is a cross-sectional view, partially cut away, of the bed assembly with a side crimp tab in a locked position.

Referring to FIGS. 3 and 4, wherein reference is being made to only one of the two complementary longitudinal sides 22, 24 for purposes of simplicity, the side support surface 42 along the longitudinal side 22 is spaced apart from and parallel to the bed surface 40. A riser 43 elevates the side support surface 42 in relation to the bed surface 40 of the floor pan 16. The side support surface 42 includes a side groove 44 and a side channel 46, discussed in greater detail subsequently.

Referring back to FIG. 2, and similar to the longitudinal sides 22, 24, the front edge 18 of the floor pan 16 includes a front support surface 41 for receiving the headboard 34. The front support surface 41 includes a front groove 43.

The floor pan 16 may be formed by various manufacturing processes including, but not limited to, roll forming, pultrusion, and injection or compression molding. The forming of the floor pan 16 via roll forming, pultrusion, or molding results in a reduced weight floor pan as compared to floor pans that are made of steel. As a result, the weight of the bed assembly 14 and the motor vehicle 10 is also reduced.

The floor pan 16 includes a first plurality of corrugations 48 extending longitudinally along the bed surface 40 between the front 18 and rear 20 edges. The first plurality of corrugations 48 provides strength to the floor pan 16 in order to allow the floor pan 16 to withstand loads applied thereon. Floor supports 50 are positioned underneath the floor pan 16 and extend transverse to the longitudinal sides 22, 24 thereof to provide load-bearing support to the floor pan 16. In addition, a rear support 52 is positioned underneath the floor pan 16 and disposed adjacent the rear edge 20 thereof to provide additional load bearing support to the floor pan 16. Both the plurality of floor supports 50 and the rear support 52 are preferably formed from a metal material.

Referring to FIG. 3, the sidewall panel 26 includes inboard 54 and outboard 56 walls defining an interior cavity 58. Although only one of the sidewall panels 26 is shown, it will be appreciated that the same applies equally to the other sidewall panel 28. The inboard wall 54 extends between a lower end 60 and an upper end 62. The lower end 60 defines a base surface, generally indicated at 64, which is disposed adjacent to and is supported by the side support surface 42 of the floor pan 16. The base surface 64 extends along a portion of the sidewall panel 26 and includes a downwardly extending flange 66 and an outwardly extending flange 68. The downwardly extending flange 68 fits inside the side groove 44 of the side support surface 42 to secure the sidewall panel 26 to the floor pan 16. In addition, the outwardly extending flange 68 is received within the side channel 46.

Figure 5:
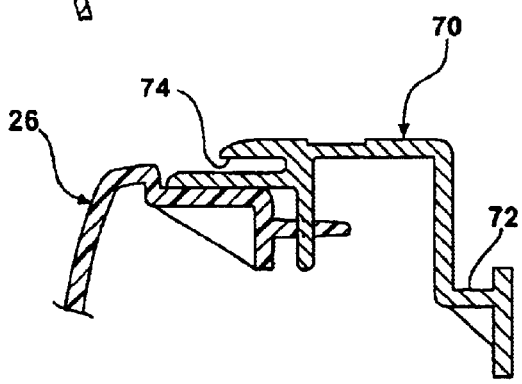
FIG. 5 is an enlarged, cross-sectional view of circle 5 in FIG. 4.

Referring to FIGS. 3 and 5, the upper end 62 of the inboard wall 54 includes a tonneau cover attachment, generally indicated at 70, for securing a hard or soft tonneau cover (both not shown) to the sidewall panel 26. The tonneau cover attachment 70 includes a J-shaped hook 72 for receiving the hard tonneau cover, and a recess 74 formed for receiving a belt retainer (not shown) of the soft tonneau cover, as described in U.S. Pat. Nos. 4,757,854, 5,947,546, and 5,979,968.

Referring back to FIG. 2, the sidewall panel 26 includes a plurality of dividers 76 positioned between the plurality of storage compartments 78, 80, 82. Each of the plurality of storage compartments 78, 80, 82 allows for the storage of smaller items, such as tools, first aid supplies, and the like. Although three storage compartments 78, 80, 82 are shown in FIG. 2, it will be appreciated that the number of storage compartments will vary depending upon the design of the sidewall panel 26. The plurality of storage compartments 78, 80, 82 is disposed adjacent one another. The sidewall panel 26 may include additional storage space 84, 86 to increase the stowing capacity of two of the plurality of storage compartments 78, 82, respectively. It can be seen, however, that one of the plurality of storage compartments 80 does not extend downwardly similar to the other two storage compartments 78, 82 to provide additional storage space due to the positioning of a wheelwell closure 88, which is shaped to fit over a wheel 90 (shown in FIG. 1).

Referring to FIGS. 3 and 4, a hinge 92 is fixedly secured to the inboard wall 54 of the sidewall panel 26. A door 94 is attached to the hinge 92 so that the door 94 may be pivotally opened or closed for access to one or all of the plurality of storage compartments 78, 80, 82. The number of doors 94 provided depends upon the design specifications of the sidewall panel 26.

The sidewall panels 26, 28 are preferably formed from injection or compression molded thermoset or thermoplastic materials. Further, the sidewall panels 26, 28 may be formed using S-RIM, spray lay up, or sheet molding compound processes.

The bed assembly 14 also includes a retention member, generally indicated at 96, extending along a portion of the longitudinal side 22. In the first embodiment, the retention member 96 is a side crimp tab 98 extending out from the side support surface 42 of the floor pan 16 to retain the base surface 64 to the side support surface 42. The side crimp tab 98 is movable between an unlocked position, in which the side crimp tab 98 is positioned away from the base surface 64 to allow for insertion of the sidewall panel 26 into the side groove 44, and a locked position, in which the side crimp tab 98 closes against the base surface 64 to maintain the sidewall panel 26 in abutting relation to the floor pan 16, as is shown in FIG. 4. FIG. 3 represents the side crimp tab 98 in a position intermediate between the unlock position and the locked position. A layer of adhesive material 100 is applied along the side support surface 42 to further secure the base surface 64 thereto.

Referring once again to FIG. 2, a bottom portion 102 of the headboard 34 includes an attachment surface 104 that is adjacent to and supported by the front support surface 41 of the floor pan 16. The attachment surface 104 includes a downwardly extending attachment flange 106 that fits within the front groove 43. The attachment flange 106 is preferably T-shaped. A front crimp tab 108 is located along the front support surface 41 and is movable from an unlocked position to a locked position. The front crimp tab 108 moves from the unlocked position to the locked position after insertion of the attachment flange 106 into the front groove 43 to secure the headboard 34 to the floor pan 16.

The headboard 34 may be formed by various manufacturing processes including, but not limited to, roll forming, pultrusion, and injection or compression molding. A second plurality of ribs 109 is formed along the headboard 34 during the headboard manufacturing process to provide added strength thereto.

Figure 7:
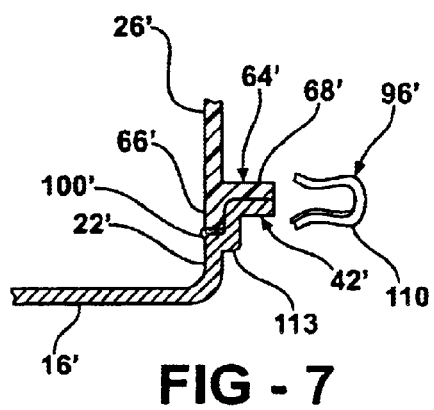
FIG. 7 is a cross-sectional view, partially cut away, of a sidewall panel and a floor pan incorporating the second embodiment of the invention.
Figure 6:
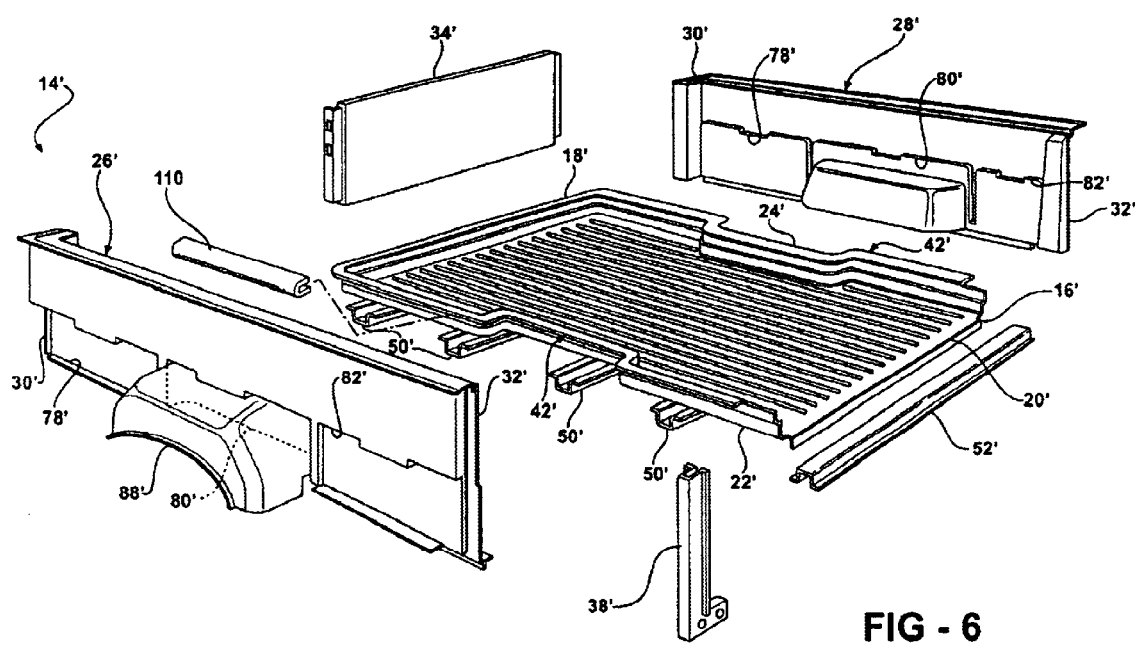
FIG. 6 is an exploded, rear, perspective view of a bed assembly according to a second embodiment of the invention.

Referring to FIGS. 6 and 7, wherein like primed reference numerals represent similar elements as those described above, in a second embodiment of the bed assembly 14', the retention member 96' for securing the sidewall panels 26', 28' to the floor pan 16' is a clip 110. The base surface 64' of the sidewall panel 28' includes the downwardly 66' and outwardly 68' extending flanges. The side support surface 42' along each longitudinal side 22' of the floor pan 16' includes an outward step 113 to support the downwardly 66' and outwardly 68' extending flanges therealong.

Referring to FIG. 7, the clip 110 fits around the outwardly extending flange 68' and a portion of the side support surface 42' in abutting relation with the outwardly extending flange 68' to secure the sidewall panel 26' to the floor pan 16'. The clip 110 is generally C-shaped and has varying lengths depending upon design preferences. For example, the clip 110 may extend along an entire length of one of the longitudinal sides 22', 24' of the floor pan 16', or the clip 110 may engage only a small portion of one of the longitudinal sides 22', in which case multiple clips 110 may be positioned along the longitudinal side 22', 24' to secure the sidewall panel 26' to the floor pan 16'.

Figure 8:
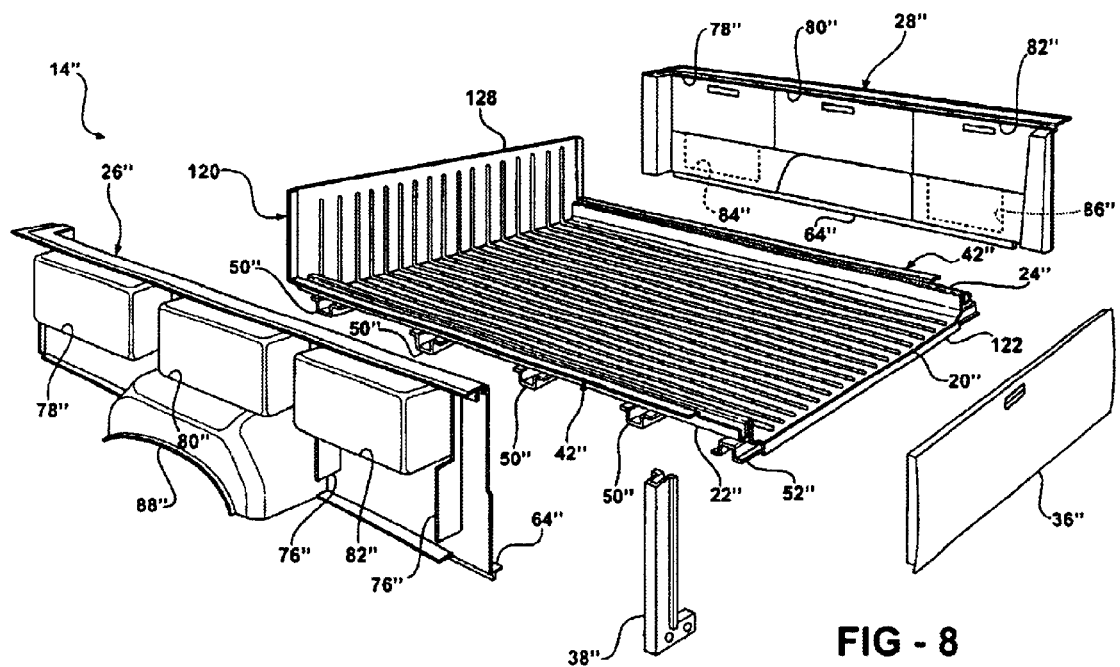
FIG. 8 is an exploded, rear, perspective view of a bed assembly according to a third embodiment of the invention.

Referring to FIG. 8, wherein like double primed reference numerals represent similar elements as those described above, a third embodiment of the bed assembly 14' includes an integrally formed one-piece floor pan-headboard, generally indicated at 120, that is used in the stead of the separately formed floor pan 16, 16' and headboard 34, 34' of the previous embodiments. The one-piece floor pan-headboard 120 includes a floor pan portion 122 having longitudinal sides 22", 24", and a headboard portion 128. The floor pan sides 124, 126 include the side support surface 42", the base surface 64", and the side crimp tab 98" as shown in the first embodiment to secure the sidewall panel 26" to the one-piece floor pan-headboard 120.

The one-piece floor pan-headboard 120 is preferably formed via roll forming a thin sheet of metal or by pultruding long glass fibers into a fiber mat. The thin sheet of metal or fiber mat is then folded at a cut-out (not shown) to form the floor pan portion 122 and the headboard portion 128. The side support surface 64" and the side crimp tab 98" are formed along sides of the thin sheet of metal or the fiber glass mat during the chosen forming process. In either case, the resulting one-piece floor pan-headboard 120 contributes to overall weight reduction of the bed assembly 14".

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A bed assembly for a motor vehicle comprising:
   a floor pan defining a bed surface extending between longitudinal sides, each of said longitudinal sides including a side support surface spaced from and parallel to said bed surface;
   a sidewall panel having a lower end defining a base surface disposed adjacent to and supported by said side support surface; and
   a retention member extending along a portion of one of said longitudinal sides and securing said base surface to said side support surface to maintain said sidewall panel in abutting relation to said floor pan, wherein said retention member is a side crimp tab extending alone a portion of each of said side support surfaces and movable from an unlocked position to a locked position.

2. A bed assembly as set forth in claim 1 wherein said base surface defines a downwardly extending flange.

3. A bed assembly as set forth in claim 2 wherein each of said side support surfaces defines a side groove extending along a portion of said longitudinal side to receive said downwardly extending flange therein.

4. A bed assembly as set forth in claim 3 wherein said base surface defines an outwardly extending flange.

5. A bed assembly as set forth in claim 4 wherein each of said side support surfaces includes a side channel to receive said outwardly extending flange therein.

6. A bed assembly as set forth in claim 5 including a layer of adhesive material applied along said side support surface to further secure said base surface thereto.

7. A bed assembly as set forth in claim 6 including a plurality of supports positioned underneath said floor pan and extending between said longitudinal sides transverse thereto.

8. A bed assembly as set forth in claim 7 wherein said sidewall panel includes outboard and inboard walls defining an interior cavity therebetween.

9. A bed assembly as set forth in claim 8 wherein said sidewall panel includes a divider to define a storage compartment.

10. A bed assembly as set forth in claim 9 including a door pivotally hinged to said inboard wall of said sidewall panel to selectively allow access to said storage compartment.

11. A bed assembly as set forth in claim 10 wherein said sidewall panel includes a tonneau cover attachment.

12. A bed assembly as set forth in claim 11 wherein said sidewall panel is molded from a plastic material.

13. A bed assembly as set forth in claim 12 wherein said tonneau cover attachment includes a J-shaped hook.

14. A bed assembly as set forth in claim 12 wherein said tonneau cover attachment includes a tonneau cover-receiving recess.

15. A bed assembly as set forth in claim 1 including a headboard having a bottom portion defining an attachment surface.

16. A bed assembly as set forth in claim 15 wherein said floor pan includes a front edge including a front support surface spaced from and parallel to said bed surface for receiving said attachment surface.

17. A bed assembly as set forth in claim 16 including a front crimp tab extending along said front support surface and movable from an unlocked position to a locked position to secure said attachment surface to said front support surface.

18. A bed assembly for a motor vehicle comprising:
a floor pan defining a bed surface extending between longitudinal sides, each of said longitudinal sides including a side support surface spaced from and parallel to said bed surface;
a sidewall panel having a lower end defining a base surface disposed adjacent to and supported by said side support surface;
and a retention member extending along a portion of one of said longitudinal sides and securing said base surface to said side support surface to maintain said sidewall panel in abutting relation to said floor pan, wherein said retention member is a clip removably secured to said base surface and said side support surface.

19. A bed assembly as set forth in claim 18 wherein said base surface includes a downwardly extending flange and an outwardly extending flange.

20. A bed assembly as set forth in claim 19 wherein each of said side support surfaces includes an outward step for supporting said outwardly extending flange therealong.

21. A bed assembly as set forth in claim 20 including a layer of adhesive material applied along said side support surface to further secure said base surface thereto.

22. A bed assembly as set forth in claim 21 including a plurality of supports positioned underneath said floor pan and extending between said longitudinal sides transverse thereto.

23. A bed assembly as set forth in claim 22 wherein said sidewall panel is molded from a plastic material.

24. A bed assembly as set forth in claim 23 wherein said clip extends all along one of said longitudinal sides.

25. A bed assembly for a motor vehicle having a passenger cab, said bed assembly comprising:
an integrally formed, one-piece floor pan-headboard having a headboard portion adapted to be secured to the passenger cab and a floor pan portion defining a bed surface extending between longitudinal sides, said longitudinal sides each including a side support surface spaced from and parallel to said bed surface;
a sidewall panel having a lower end defining a base surface disposed adjacent to and supported by said side support surface; and
a retention member extending along a portion of one of said longitudinal sides and securing said base surface to said side support surface to maintain said sidewall panel in abutting relation to said floor pan, wherein said retention member is a side crimp tab extending along a portion of each of said side support surfaces and movable from an unlocked position to a locked position.

26. A bed assembly as set forth in claim 25 wherein said base surface defines a downwardly extending flange.

27. A bed assembly as set forth in claim 26 wherein each of said side support surfaces defines a side groove extending along a portion of said longitudinal side to receive said downwardly extending flange therein.

28. A bed assembly as set forth in claim 27 wherein said base surface defines an outwardly extending flange.

29. A bed assembly as set forth in claim 28 wherein each of said side support surfaces includes a side channel to receive said outwardly extending flange therein.

30. A bed assembly as set forth in claim 29 including a layer of adhesive material applied along said side support surface to further secure said base surface thereto.

31. A bed assembly as set forth in claim 30 including a plurality of supports positioned underneath said floor pan and extending between said longitudinal sides transverse thereto.

32. A bed assembly as set forth in claim 31 wherein said sidewall panel includes outboard and inboard walls defining an interior cavity therebetween.

33. A bed assembly as set forth in claim 32 wherein said sidewall panel includes a divider to define a storage compartment.

34. A bed assembly as set forth in claim 33 including a door pivotally hinged to said inboard wall of said sidewall panel to selectively allow access to said storage compartment.

35. A bed assembly as set forth in claim 34 wherein said sidewall panel is molded from a plastic material.

* * * * *